United States Patent [19]

Gell et al.

[11] 4,337,591
[45] Jul. 6, 1982

[54] FISHING LURE SYSTEM

[76] Inventors: Harold A. Gell, 13720 Lockdale Rd., Silver Spring, Md. 20906; Daniel P. Olszewski, 124 Mars Ct., Indialantic, Fla. 32903

[21] Appl. No.: 143,329

[22] Filed: Apr. 24, 1980

[51] Int. Cl.³ ............................................. A01K 85/00
[52] U.S. Cl. ................................. 43/42.09; 43/42.22; 43/42.33; 43/42.39
[58] Field of Search ................. 43/42.09, 42.22, 42.33, 43/42.39

[56] References Cited

U.S. PATENT DOCUMENTS

| | | | |
|---|---|---|---|
| 1,477,864 | 12/1923 | Bolton | 43/42.39 |
| 1,740,335 | 12/1929 | Cowan | 43/42.09 |
| 2,494,384 | 1/1950 | Gadzinski et al. | 43/42.09 |
| 2,563,282 | 8/1951 | Schenck | 43/42.22 |
| 3,015,904 | 1/1962 | Trani | 43/42.09 |
| 3,408,764 | 11/1968 | McCurry | 43/42.09 |
| 3,628,276 | 12/1971 | Coalson | 43/42.09 |
| 3,913,257 | 10/1975 | Colgan | 43/42.09 |

*Primary Examiner*—Stephen G. Kunin
*Assistant Examiner*—K. Bradford Adolphson
*Attorney, Agent, or Firm*—Harold Gell

[57] ABSTRACT

A fishing lure system is presented wherein a lure comprised of a central core including hook hangers, leader connection apparatus, and a cavity for receiving one of a plurality of depth controlling weights is provided in combination with a plurality of calibrated depth controlling weights, a plurality of fish attracting designs adapted to encase the central core, a clear plastic shell adapted to encase the central core, selected depth controlling weight and fish attracting design and a band which secures the lure components together and provides action imparting surfaces.

2 Claims, 5 Drawing Figures

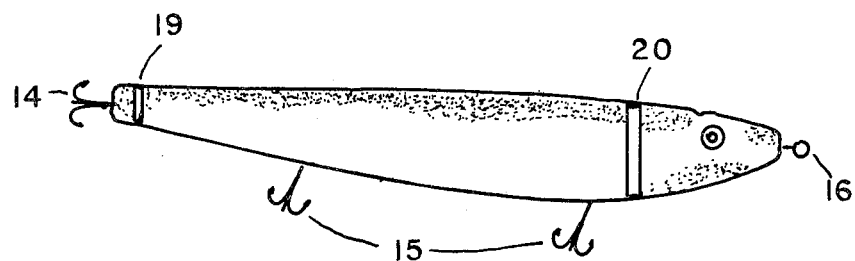
FIG. 1
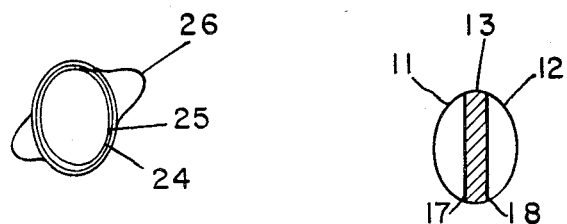
FIG. 5
FIG. 2
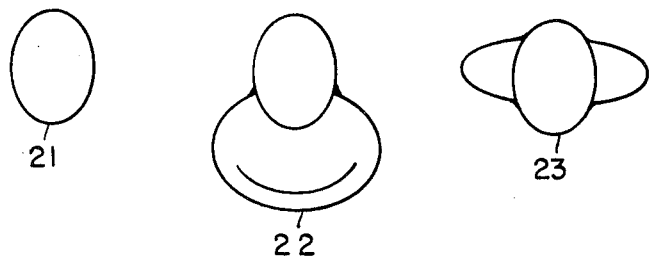
FIG. 4

FISHING LURE SYSTEM

THE INVENTION

This invention relates to fishing lures which have a life-like appearance and are provided to the user in the form of a central section incorporating hook connection means, a plurality of calibrated depth controlling weights, a plurality of fish attracting patterns, an outer transparent protective body adapted to encase the central section, a calibrated depth controlling weight, and a visual pattern and a band which secures the lure components together and supports action imparting appendages.

BACKGROUND OF THE INVENTION

The art of fishing with artificial lures is practiced both for commercial gain and for enjoyment by numerous fishermen. To be successful in the sport requires considerable skill and knowledge of the quarry plus a large selection of artificial baits in a variety of sizes, colors and actions, all calculated to entice a fish under a given set of environmental circumstances. A successful angler needs lures designed to operate at a variety of depths so that he may present a bait at the optimum depth for water conditions which control the location of his quarry. The angler must also have a variety of different colored and patterned lures for the proper depth so that the bait will be attractive to the quarry in the precise water conditions and lighting conditions existing at the time of presentation. Finally, the angler must have a variety of different action simulating lures for the proper depth and color pattern. It is obvious that these problems require an angler to possess an extremely large variety of fishing lures if he is to be successful in attracting the quarry. This requires a significant capital investment and necessitates complex logistic problems in transporting the required artificial baits to the fishing site. In fact, the problems are generally insurmountable and the angler proceeds with a token quantity of the lures required to be successful.

OBJECTIVES OF THE INVENTION

Therefore, it is a primary objective of the present invention to provide a fishing lure system comprised of a center body section, a plurality of depth calibrated weights, a plurality of color patterns, a transparent outer lure body shell adapted to encase the center body section, a selected depth controlling calibrated weight and a selected color pattern together and a band to secure the components together and support action imparting means to form a fish attracting lure.

Another objective of the present invention is to provide a fishing lure system which incorporates means for containing one of a plurality of calibrated, depth controlling ballast means.

A further objective of the present invention is to provide a fishing lure system wherein a basic lure is provided with a plurality of interchangeable color patterns.

A still further objective of the invention is to provide a lure with a plurality of interchangeable, action imparting bands.

The foregoing and other objectives of the invention will become apparent in light of the specification, drawings and claims which form a part of this patent.

SUMMARY OF THE INVENTION

This invention presents a fishing lure system which is comprised of a fishing lure adapted to interchangeably receive a selected depth controlling ballast weight from a plurality of selected calibrated weights, a selected color pattern from one of a plurality of supplied color patterns and a selected action imparting means from a plurality of supplied lure securing bands supporting various action imparting means. This is accomplished by providing a fishing lure fabricated from a central body section adapted to support hook hangers and leader attaching means and provide a receptacle for a depth controlling ballast. A plurality of calibrated depth controlling ballast weights are supplied with the center body section as are a plurality of fish attracting patterns graphically reproduced on waterproof material dimensioned to cover the center body section. An outer body comprised of two clear plastic body halves is adapted to enclose the center body section with a selected ballast weight and selected pattern. A plurality of interchangeable clamp means such as bands are provided to hold the two body halves together while the lure is being utilized. The bands support a variety of different action imparting vanes.

DESCRIPTION OF THE DRAWINGS

FIG. 1 is a side view of a fishing lure assembled from the component parts of the subject fishing lure system.

FIG. 2 is a front view of an assembled fishing lure of the present invention illustrating action imparting appendages.

FIG. 4 illustrates typical body securing bands.

FIG. 5 illustrates a spinner securing band.

DESCRIPTION OF THE INVENTION

Figure 3:
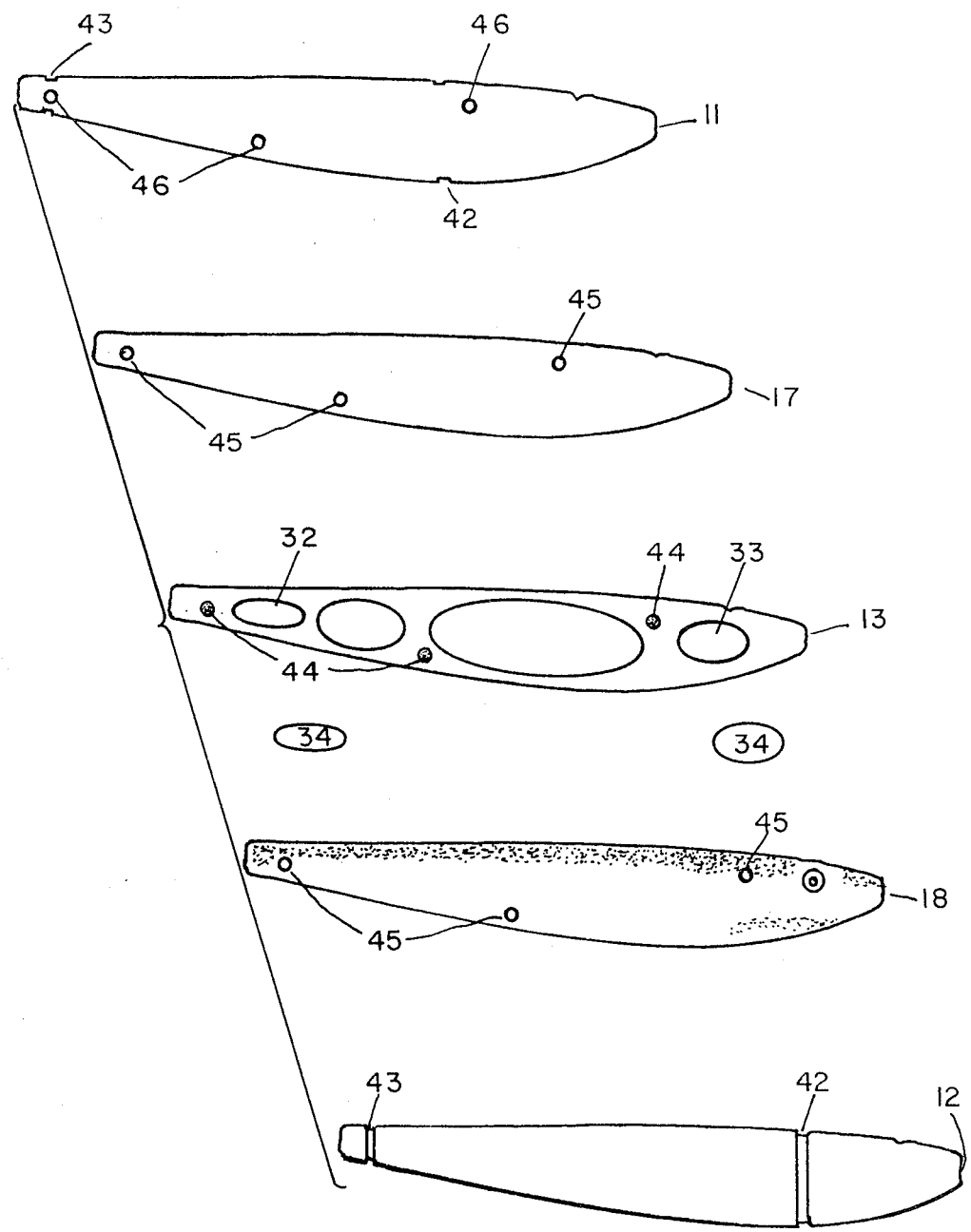
FIG. 3 is an exploded view of the various component parts of the fishing lure system

FIGS. 1 and 2 depict the side and front views of a fishing lure constructed from the component parts of the present invention. Clear plastic body halves 11 and 12 encompass a central body core 13, which supports the fishing hooks 14 and 15 and leader attaching means 16, and color patterns 17 and 18 which flank either side of the central body core. The body halves 11 and 12 are secured together in the illustrated embodiment by bands 19 and 20 which snap into grooves provided in the clear plastic body halves 11 and 12.

The central body section 13 and clear plastic body halves 11 and 12 may be fabricated in the manner suggested in the co-pending patent application on "Fishing Lure And Method of Fabrication", Ser. No. 142,868 filed Apr. 24, 1980.

Bands 19 and 20 which secure the fishing lure body halves together are selected from a plurality of bands supplied as part of the fishing lure system. The bands are in different configurations and function to hold the lure body halves together and impart desired action. For instance, FIG. 4 illustrates three basic embodiments used for either the front or rear bands 19 or 20 respectively. Band 21 is a plain band which fits flush with the outer surface of the fishing lure body and imparts no significant action. Band 22 when incorporated as the forward band, provides a diving or popping action to the lure and when utilized as the rear band creates a fish tailing action. Band 23 when used as the forward band creates a paddling action.

FIG. 5 illustrates another form of band used to secure the lure body halves together. This band is comprised of a central band 24 which includes a peripheral slot 25 which is adapted to receive a spinner blade assembly 26 adapted to rotate within groove 25 as the lure is retrieved through the water.

FIG. 3 depicts the basic components of a fishing lure before they are secured together. The central body core 31 includes two openings, 32 and 33 which are dimensioned and adapted to receive ballasting weights. The lure system is provided with a plurality of weights to fit within openings 32 and 33 so that the user may assemble the lure with forward weights, rear weights or forward and rear weights of calibrated masses calculated to create specific types of lure action at specific depths. The weights 34 have embossed identification therein to facilitate their selection and use in accordance with a lure operational schedule provided with the system.

The system is provided with a plurality of pairs of color patterns printed on plastic or other waterproof film or material. FIG. 3 illustrates a pair of such color patterns and shows their relationship with respect to the center body section. These color patterns 17 and 18 are printed on both sides in a preferred embodiment to simplify lure assembly processes and manufacturing and supply logistics. However, it should be understood that the color patterns need be printed only on the exterior surface.

The lure body halves 11 and 12 include grooves 42 and 43 to receive the securing bands as previously described.

If desired, snap projections 44 may be provided on the center body section in the form of male projections which cooperate with holes 45 in the color patterns 17 and 18 so that they may be properly aligned. The male projections 44 on the central body section cooperate with female snap receivers 46 located in body halves 11 and 12 and function to secure the component parts together. If desired, the center body section can be provided with bores instead of male pins 44 and one of the lure body halves 11 or 12 may be provided with male pins which will pass through the bores in the color patterns and center body section to cooperate with female snap fasteners in the other body half.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A fishing lure system, comprising:
a central body section including hook and leader connection means and means for receiving a calibrated ballast weight;
a plurality of calibrated ballast weights;
a plurality of pairs of bait simulating patterns;
left and right transparent body halves adapted to encompass said center body section, a selected one of said calibrated ballast weights, and a selected pair of said pairs of bait duplicating patterns; and a band to secure said center body section, said selected ballast weight, said selected pair of bait duplicating patterns and said left and right body halves together whereby said assembly may be disassembled and reassembled utilizing different ones of said calibrated weights and said bait duplicating patterns, said band including projection means for interacting with the water as the lure is retrieved to impart motion to the lure.

2. A fishing lure system as defined in claim 1 including a plurality of said bands having different water interacting configurations.

* * * * *